United States Patent [19]

Hehl

[11] 4,190,409
[45] Feb. 26, 1980

[54] APPARATUS FOR INJECTING CONFLUENT STREAMS OF PLASTIC

[76] Inventor: Karl Hehl, Arthur-Hehl-Strasse 32 7298, Lossburg 1, Fed. Rep. of Germany

[21] Appl. No.: 842,105

[22] Filed: Oct. 14, 1977

[51] Int. Cl.² ............................................. B29F 1/12
[52] U.S. Cl. .................................. 425/132; 366/156
[58] Field of Search ............. 425/130, 132, 561, 562, 425/555, 202; 366/79, 83, 152, 154, 156

[56] References Cited

U.S. PATENT DOCUMENTS

| 2,418,856 | 4/1947 | Stacy ........................ 425/130 X |
| 3,733,156 | 5/1973 | Garner ........................ 425/132 |
| 3,774,890 | 11/1973 | Lemelson ................. 425/202 X |
| 3,945,784 | 3/1976 | Collins ........................ 425/130 |
| 3,979,170 | 9/1976 | Monnet ........................ 425/130 |
| 4,029,454 | 6/1977 | Monnet ........................ 425/130 |

FOREIGN PATENT DOCUMENTS

| 1944474 | 3/1970 | Fed. Rep. of Germany ............ 425/130 |
| 2122604 | 11/1971 | Fed. Rep. of Germany ............ 425/132 |
| 2425627 | 12/1974 | Fed. Rep. of Germany ............ 425/132 |
| 2445112 | 3/1975 | Fed. Rep. of Germany ............ 425/132 |
| 2449758 | 4/1976 | Fed. Rep. of Germany ............ 425/132 |
| 1382291 | 11/1964 | France ................................ 425/132 |
| 49-16541 | 4/1974 | Japan ................................ 425/132 |
| 51-25555 | 3/1976 | Japan ................................ 425/130 |
| 52-27655 | 7/1977 | Japan ................................ 425/130 |
| 354837 | 8/1931 | United Kingdom ................. 425/132 |

Primary Examiner—William R. Briggs
Attorney, Agent, or Firm—Joseph A. Geiger

[57] ABSTRACT

An apparatus for the production of marbled articles by injecting into the injection molding die of an injection molding machine two confluent streams of plastic raw material of different hue or color which are supplied from two injection units, via separate pulsation channels which open into a common nozzle channel, just ahead of the mold cavity. The plastic raw materials flowing in the two pulsation channels are subjected to an intermittant and alternatingly pulsating advance by means of feed thrust pulsation controls which generate an intermittent advance of the plastification screws of the injection units. At the junction between the two pulsation channels may be arranged a pulsation chamber with oppositely oriented material entry ports which are alternatingly closed by a reciprocating pulsating element which moves with the pulsating plastic streams.

10 Claims, 13 Drawing Figures

APPARATUS FOR INJECTING CONFLUENT STREAMS OF PLASTIC

BACKGROUND OF THE INVENTION

1. Field of the Invention

The present invention relates to injection molding machines and die closing units for injection molding machines, and, more particularly, to a method and apparatus for the injection of confluent streams of different plastic materials into an injection molding die, for the production of plastic articles of marbled or mottled appearance.

2. Description of the Prior Art

In U.S. Pat. No. 2,418,856 is described a method and apparatus for injection molding by which plastic raw materials of different characteristics and colors may be blended during injection, so as to produce a mottling of the materials in the articles. This effect is obtained by means of a special injection unit which has two parallel injection cylinders with cooperating injection pistons which may be advanced in unison or independently, for the injection of two separate streams of plastic material discharging in concentric streams from the mouth of an injection nozzle, directly into the sprue channel of the injection molding die. It is inside the sprue channel and inside the mold cavity itself, where the two streams of different plastic materials come in contact with each other and are intermingled to a greater or lesser degree, depending on the path of the materials.

Another method and device for the intermingling of streams of plastic raw material, and for the subsequent injection thereof into an injection molding die, is disclosed in the German Offenlegungsschrift (Published Application) No. 24 45 107. There, the material streams from two injection units are fed through parallel channels to a revolving mixing valve which alternatingly connects one or the other of the material streams to a common central injection channel of the injection unit. This method and apparatus subdivide the material streams into a succession of separate quantitative increments or charges which enter the injection molding die in a succession of charges coming alternatingly from the two material streams. In a modified version of this prior art method and apparatus, one material stream is maintained in a continuous fashion, while the other material stream is subdivided into a succession of charges which are injected into the continuous material stream.

SUMMARY OF THE INVENTION

It is a primary objective of the present invention to provide an improved method and apparatus for the injection of confluent streams of plastic material into an injection molding die, which differ from the prior art in that they provide ready adaptability to a great variety of different marbling or mottling requirements and that each particular pattern of material intermingling can be programmed more exactly and reproduced easily, at minimal operational cost. Another objective, obviously, is the achievement of these ends with a minimal increase in the complexity and cost of the injection molding machine itself.

The present invention proposes to attain the above objectives by suggesting an improved method for injecting confluent streams of plastic material into an injection molding die by periodically creating a pressure difference between the injection channels of two injection units, so as to create correspondingly differing flow speeds of the different materials in the two injection channels, whereby the frequency of these periodic pressure differences is chosen such that a pulsating action of the plastic material is created in at least one injection channel and the material is discharged into a common nozzle channel, in a succession of incremental charges coming alternatingly from one or the other injection unit.

The invention further proposes an apparatus for the performance of this novel method which features two injection units with plastification cylinders and plastification screws, where the axial movements of the material-injecting plastification screws are controlled hydraulically by a pulsation circuit, creating either an intermittant advance of one plastification screw, along with a non-intermittant advance of the other plastification screw, or intermittant, but phase-shifted pulsation amplitudes in both plastification screws, whereby the pulsation frequency and amplitude, determining the average injection speed, are adjustable.

Additional features of the novel injection method and injection molding machine are suggested in several embodiments of the invention. For example, it has been found to be of particular importance that the two plastic streams are joined in the region of the injector nozzle channel, just prior to their entry into the mold cavity, because of the apparent existance of an interdependence between the programmability and the reproducibility of the marbling patterns and the distance between the point of incremental confluence of the plastic streams from the molding cavity, the reproducibility of a marbling pattern being the more exact, the more said distance decreases. In the past, when stringent requirements had to be met in terms of the uniformity of marbling of certain injection-molded articles, especially spectacle frames and the like, it has been necessary to sort out and reject a large percentage of molded articles in a time-consuming sorting operation. The arrangement of the point of confluence of the two plastic streams very close to the mold cavity has made it possible to eliminate this sorting operation, because the marbling patterns which are obtainable with this improvement are very uniform and reproducible to a high degree.

The novel method of the invention is used primarily for the production of plastic articles from differently colored raw materials which flow together in the process of injection, thereby creating various patterns of marbled outward appearance. It is most frequently used in connection with the production of such articles as combs, spectacle frames, belt buckles, and the like, where the marbling of the plastic materials is to give the articles an appearance which is similar to that of articles which are made of natural horn. In most cases, the two raw materials used are colored and non-colored plastic materials, respectively, or two plastic raw materials of relatively lighter and darker color.

In a preferred embodiment of the invention, the die closing unit of the injection molding machine carries two injection units which feed plastified raw material streams through converging pulsation channels to a common nozzle channel which leads to the molding cavity of the injection molding die. Appropriate feed thrust pulsation controls produce a periodic succession of pressure differences in the pulsation channels, the frequency of pulsation being preferably comprised between 0.5 and 4 seconds. This pressure pulsation creates a correspondingly pulsating flow speed in the pulsation channels, the materials flowing back and forth in the direction of pressure propagation. These pressure pulsations are preferably so timed that a pulsation amplitude of between 0.1 and 20 millimeters is obtained in at least one of the two pulsation channels. Depending on the circumstances, the pressure difference may be only a few kg/cm$^2$, or it may reach a value as high as 60 kg/cm$^2$.

The discharge of plastic raw material from the two pulsation channels into the common injection channel takes place during that part of the pulsation amplitude in which either the colored or non-colored raw material stream is forcibly advanced in the direction of the injection molding die, so that a succession of alternating charges of colored and non-colored raw material is injected into the mold cavity, where the materials of the charges becomes partially intermingled, thereby creating the desired marbled pattern in the appearance of the finished article.

The pulsation pressure is obtained by means of appropriate feed thrust pulsation controls on the two injection units which create intermittant displacement advances on one or both plastification screws during their injection strokes, depending on whether the two material streams are to pulsate in an alternating fashion, or whether one material stream is injected into the other in a pulsating manner.

The feed thrust pulsation is preferably obtained by means of electronically controlled valves in the hydraulic circuit which drives the two plastification screws, the valves being of the bypass type or of the reversing type. In the case of reversing valves, the hydraulic pressure is switched from one plastification screw to the other; in the case of bypass valves, the pressure is merely diverted away from one plastification screw. The pulsation amplitude can be adjusted by means of appropriate throttle valves. A simple electronic pulse generating circuit, preferably with adjustable pulse frequency, serves to initiate the valve switching action of the feed thrust pulsation controls.

For the production of spectacle frames, for example, which requires the use of one injection unit with non-colored plastic raw material and another injection unit with colored plastic raw material, the amplitude of pressure pulsation is approximately 20 kg/cm$^2$, at a pulsation period of approximately 1.5 seconds.

In a preferred embodiment of the apparatus of the invention, the approach of the point of confluence to the mold cavity of the die is obtained by arranging for the pulsation channels to converge inside the discharge nozzle of the horizontal injection unit, which nozzle thereby serves as the common injection nozzle, the pulsation channel of the vertical injection unit leading through the wall of the plastification cylinder of the horizontal unit.

BRIEF DESCRIPTION OF THE DRAWINGS

Further special features and advantages of the invention will become apparent from the description following below, when taken together with the accompanying drawings which illustrate, by way of example, several embodiments of the invention, represented in the various figures as follows.

DESCRIPTION OF THE PREFERRED EMBODIMENTS

Figure 1:
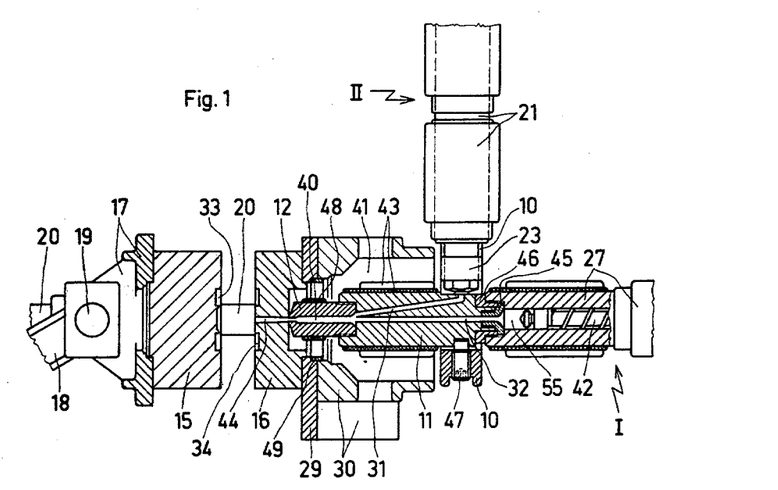
FIG. 1 shows, in a longitudinal cross section, a portion of a die closing unit of an injection molding machine, having connected thereto an injection device embodying the invention.
Figure 2:
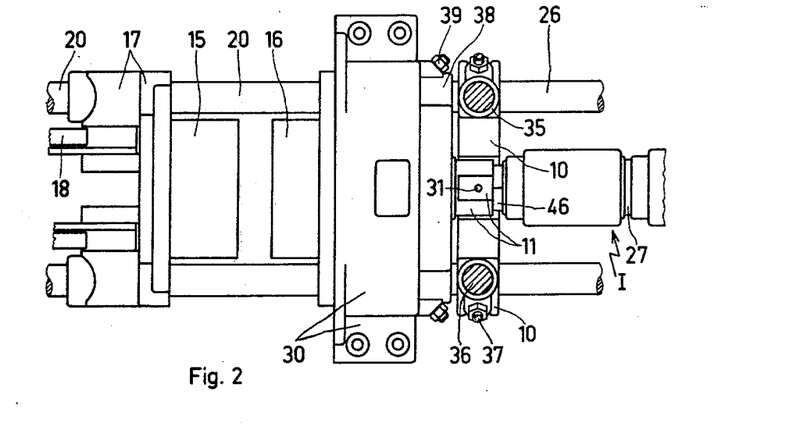
FIG. 2 is a plan view of the embodiment of FIG. 1, shown without the vertical injection unit.

Referring to FIGS. 1 and 2, there are shown portions of a die closing unit with two injection units, as part of an injection molding machine. The die closing unit consists of a stationary die carrier member 30 with a flat bottom surface, by which it is normally supported on, and rigidly attached to, a flat horizontal surface of the machine base (not shown) of the injection molding machine. To the stationary die carrier member 30 are attached two parallel horizontally oriented tie rods 20 which extend forwardly from the die carrier member 30.

At a distance from the front side of the stationary die carrier member 30 is arranged a movable die carrier 17 which is supported and guided by the two tie rods 20, for a horizontal closing and opening motion in relation to the stationary die carrier member 30. This motion is produced by a knee linkage drive of which only the extremity of the drive arms 18 and the pivot connections 19 at the movable die carrier member 17 are shown. Knee likeage drives of this type are known from the prior art. The two die carrier members 17 and 30 have parallel oppositely facing surfaces on which they carry a movable die half 15 and a stationary die half 16, respectively, which have matching mold cavities 33 and 34. The stationary die half 16 is not attached directly to the stationary die carrier member 30, but is carried by a die mounting plate 29 which, in turn, is attached to the die carrier member 30, being centered in relation thereto by means of a centering sleeve 49.

The stationary die carrier member 30 has on its rear side a large central cavity 41. Inside this cavity is arranged an injector head 11 to which are connected two complete injection units. One of these units is a horizontal injection unit I which is mounted behind the die closing unit, in axial alignment with the longitudinal axis of the latter. The other unit is a vertical injection unit II which is oriented perpendicularly to the horizontal injection unit I and connected to the injector head 11 from above.

The two injection units are supported on two parallel rearwardly extending supporting rods 26 (FIG. 2) whose forward extremities are fixedly attached in appropriate attachment eyes 38 of the stationary die carrier member 30, using clamping fasteners 39. FIG. 1 shows only the forward end portions of both injection units, while not showing the actual support of the horizontal injection unit I on the supporting rods 26, it being assumed that details of construction and operation of these injection units are known from the prior art. To the extent that the horizontal injection unit I is shown, its known components include a plastification cylinder 27 with a central bore 55 inside which is arranged a rotatable and axially displaceable plastification screw 42. Rotation of the screw, under rearward displacement, causes preheated plastic raw material to be pressurized and plastified; a subsequent axial forward displacement of the screw injects the plastified raw material into the injection molding die.

As can be seen in FIG. 1, both injection units are connected for discharge into the injector head 11 which occupies the cavity 41 of the stationary die carrier member 30, having an injector nozzle 12 at its forward extremity engaged against the sprue channel 44 of the stationary die half 16. The injector head 11 is coaxially connected to the forward extremity of the horizontal injector unit I by means of a threaded adaptor ring 46 which, by engaging a threaded bore of the plastification cylinder 27, clamps in place the flange portion of a non-closing discharge nozzle 45 whose body is screwed into the rear extremity of the injector head 11. The adaptor ring 46 is provided with facets on its flange portion, for the engagement of a wrench.

The injector head 11 is a generally cylindrical body whose main length portion is surrounded by a heater jacket 43. A rearward portion of the injector head 11 extends beyond the stationary die carrier member 30, and to this portion is rigidly attached the vertical injection unit II. For this purpose, the injector head 11 has on its rearward portion a flattened upper side which serves as a clamping face for the non-closing discharge nozzle 23 of the vertical injection unit II. A clamping screw 47 in the transversely extending mounting yoke 10 presses against the rearward portion of the injector head 11 from underneath, thereby producing a clamping action against the discharge nozzle 23. The clamping screw 47 of the mounting yoke 10 thereby also serves to counteract the reaction from the injection pressure in the vertical injection unit II, which would tend to lift the discharge nozzle 23 from the injector head 11.

The mounting yoke 10, while being guided for longitudinal displacement along the horizontal supporting rods 26, holds itself two vertical supporting rods 36 which carry the injection unit II, the rods 36 being attached to the mounting yoke 10 by means of attachment eyes 35 and clamping fasteners 37.

Inside the injector head 11 are arranged separate pulsation channels 31 and 32 for the vertical and horizontal injection units, channel 32 being arranged in axial alignment with a central nozzle channel 14 of the injector nozzle 12, while the pulsation channel 31 runs obliquely from the contact face with the discharge nozzle 23 of injection unit II to a junction point at the rearward extremity of the injector nozzle 12. This means that the non-closing discharge nozzles of both injection units are directly connected to the sprue channel 44 of the stationary die half 16, via a common nozzle channel 40 of the injector head 11. The two injection units, being each rigidly connected to the injector head 11, form a mounting unit which is axially displaceable on the horizontal supporting rods 26.

Figure 3:
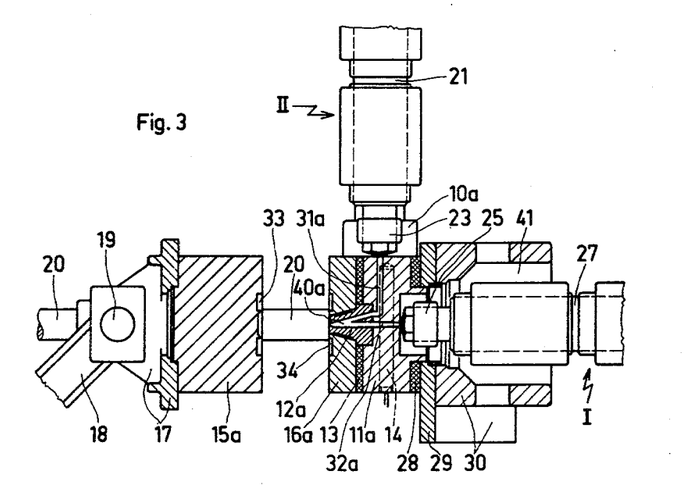
FIGS. 3 and 4 are similar to FIGS. 1 and 2, showing a second embodiment of the invention.
Figure 4:
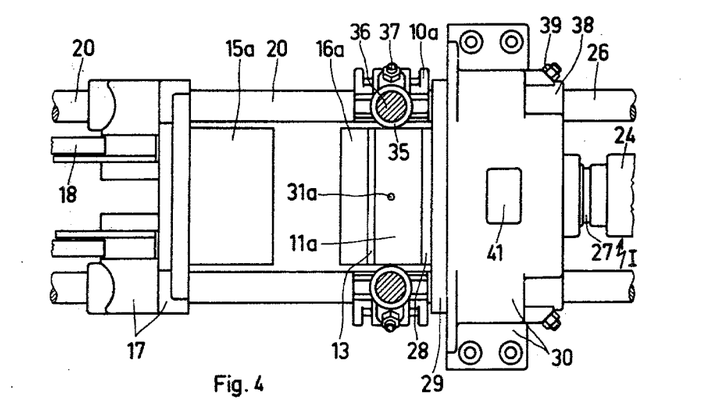

In FIGS. 3 and 4 is shown a die closing unit which is similar to the one which is shown in FIGS. 1 and 2, but for a different arrangement of the injector head. In this embodiment, the injector head 11a is incorporated in the stationary die half 16a itself. Heater plates 13 and 28 are arranged on opposite sides of the injector head 11a. The stationary die carrier member 30 and the movable die carrier member 17 are unchanged from the previously described embodiment, the member 30 having again a rearwardly open cavity 41. However, since the injector head of the previous embodiment is now part of the stationary die carrier half 16a, the discharge nozzle 25 of the horizontal injection unit I takes its place, injecting directly into a horizontal pulsation channel 32a which also serves as the sprue channel of the die half 16a.

The vertical injection unit II can thus no longer form a movable unit with the horizontal injection unit I. Instead, it is mounted on top of the stationary die half 16a, in connection with its injector head 11a. It follows that whereas in the previously described embodiment, the vertical injection unit II is supported on the rearwardly extending supporting rods 26, the vertical injection unit of this embodiment is supported on the tie rod 20 of the die closing unit. The injection unit support is again obtained by means of a transverse mounting yoke 10a, carrying vertical supporting rods 36 which are clamped inside attachment eyes 35 by means of suitable clamping fasteners 37.

The vertical injection unit II has its discharge nozzle 23 connected to a vertical pulsation channel 31a which has an elbow portion in the center of the injector head 11a, so that the pulsation channels of both injection units discharge horizontally into an injector nozzle 12a, through converging nozzle channel portions which take the place of the sprue channel of the stationary die half 16a. The junction point between the two pulsation channels 31a and 32a, where the latter discharge into the nozzle channel, is thus arranged in the immediate vicinity of the mold cavity 34.

Figure 5:
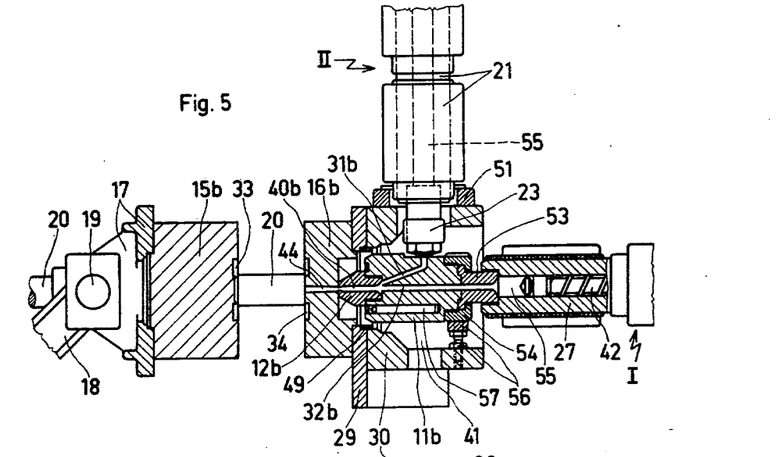
FIGS. 5 and 6 are likewise similar to FIGS. 1 and 2, showing a third embodiment of the invention.
Figure 6:
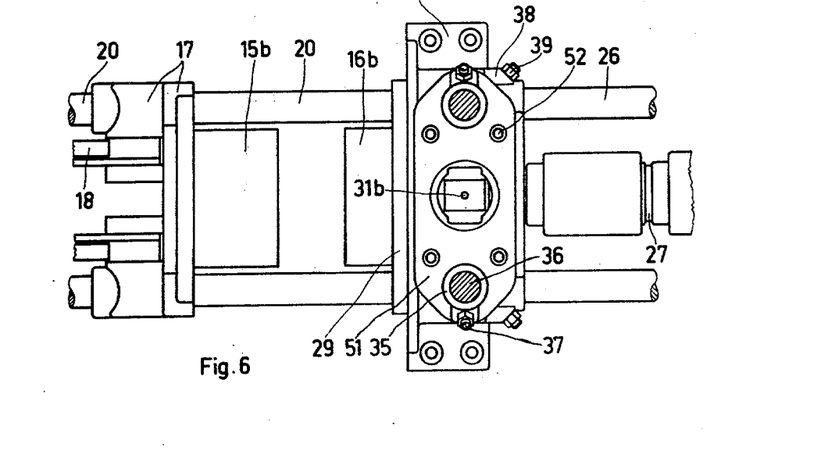

A third embodiment of the apparatus of the invention is shown in FIGS. 5 and 6. There, the vertical injection unit II is mounted on top of the stationary die carrier member 30, its plastification cylinder 21 being supported by two vertical supporting rods 36 which are clamped in mounting eyes 35 of a flat base plate 51. This plate is attached to the flat upper surface of the die carrier member 30 by means of clamping bolts 52. Appropriate apertures in the base plate 51 and in the member 30 allow for the discharge nozzle 23 of the injection unit II to reach downwardly into the cavity 41. Inside this cavity is again arranged an injector head 11b, which forms an axial extension of the horizontal injection unit I. The attachment between the plastification cylinder 27 of unit I and the injector head 11b is obtained by means of a large coupling nut 54 engaging a threaded portion of the injector head 11b and thereby clamping against the latter a flange portion of the discharge nozzle 53 of the horizontal plastification cylinder 27.

The injector head 11b of this embodiment is considerably shorter than the head 11 of the embodiment of FIGS. 1 and 2. The function of the transverse mounting yoke 10 and of the clamping screw 47 with regard to the positioning of the injector head is now performed by a simple adjustable support 56 in the form of a bolt and nut. The upper pulsation channel 31b which connects the vertical plastification cylinder 21 to the injection nozzle 12b is correspondingly shorter, joining a likewise shorter axial pulsation channel 32b of the horizontal injection unit I at the rear extremity of the injection channel 40b, inside the injection nozzle 12b. Where the earlier-described embodiment has a heater jacket 43, this embodiment has heater cartridges 57 which are embedded inside blind bores in the injector head 11b. All other essential features of this embodiment are identical with those which have been described further above, in connection with the embodiment of FIGS. 1 and 2.

In the several embodiments of the apparatus which are shown in FIGS. 7–11, the injector head has been eliminated as a separate unit of the device, its place being taken by a special discharge nozzle of the horizontal injection unit I which discharges the combined streams of plastic raw material from the two injection units directly into the sprue channel of the stationary die half. In the embodiment of FIG. 12, the stationary die half is enlarged in the axial sense, so as to accommodate two transversely spaced injector heads.

In each of the several embodiments shown in FIGS. 7–12, the two pulsation channels 66 and 67 lead to a pulsation chamber 71, entering the chamber from opposite axial sides. The pulsation chamber 71 is preferably arranged as close as possible to the entrance of the nozzle channel 40c. Inside the vibration chamber 71 is disposed an axially freely movable pulsating element 63 in the shape of two shallow cones which are joined at their base. The pulsation chamber 71 has matching tapered shoulders 69 and 70 on opposite axial sides of the pulsating element 63, so that the latter, by moving from one shoulder to the other, alternately opens and closes the vibration channels 66 and 67 of the two injection units.

Figure 7:
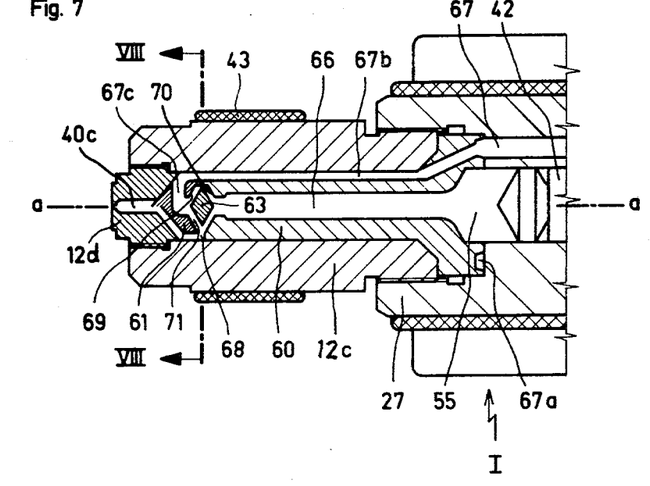
FIGS. 7 and 7a show two similar modifications of the horizontal injection unit of the invention, in an enlarged longitudinal cross section taken along line VII—VII of FIG. 8.

The cavity of the pulsation chamber 71 is formed by two axially adjoining parts which are arranged inside a large center bore of the discharge nozzle 12c. One of these two parts is a hollow nozzle core 60, extending rearwardly from the pulsation chamber 71 into the plastification cylinder 27, the other part is a distributor head 61 which is axially clamped between the nozzle core 60 and a larger short injector nozzle 12d. The latter is screwed into the forward end portion of the discharge nozzle 12c.

Inside the nozzle core 60 is arranged a central bore which serves as the pulsation channel 66 for the injection unit I, leading directly into the pulsation chamber 61, via a restricted channel neck portion. The pulsation channel 76, coming from the vertical injection unit II (see FIG. 11, for example), has a first channel portion inside the plastification cylinder 27 of the horizontal injection unit I, the pulsation channel 67 running parallel to the central bore 55 of the horizontal plastification cylinder 27, opening into an annular channel portion 67a in a flange portion of the nozzle core 60. Two oblique channel portions lead from the annular channel portions 67a to two axial channel portions 67b on the outer periphery of the nozzle core 60, being connected to two short radial channel portions 67c inside the distributor head 61, axially ahead of the pulsation chamber 71. The two radial channel portions 67c lead through a central opening into the pulsation chamber 71.

This means that the plastification screw of the horizontal injection unit I discharges a pulsating raw material stream axially forwardly into the pulsation chamber 71, while the plastification screw of the vertical injection unit II discharges a pulsating raw material stream axially rearwardly into the same pulsation chamber 71.

These alternatingly pulsating material streams move the pulsating element 63 from one axial end position to the other, whereby the element 63 reciprocates between the tapered shoulders 69 and 70 in the manner of a valve, alternatingly closing the one or the other pulsation channel. Four mixing channels 68 lead from the circumference of the pulsation chamber 71, along the cylindrical end tapered forward portions of the distributor head 61, to the central nozzle channel 40c. The two channels 67c and the four channels 68, as well as one-half of the pulsation chamber 71, with its tapered shoulder 69, are machined into the distributor head 61.

Figure 7A:
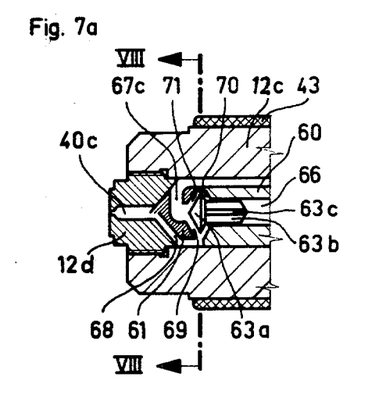
Figure 8:
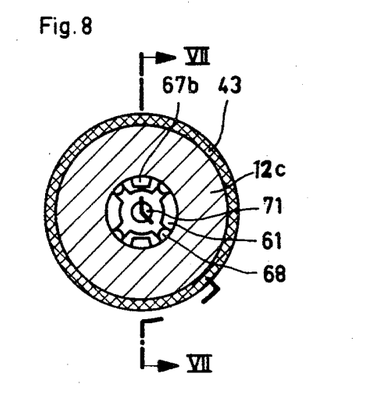
FIG. 8 is a transverse cross section of the nozzle of FIG. 7, taken along line VIII—VIII thereof.
Figure 9:
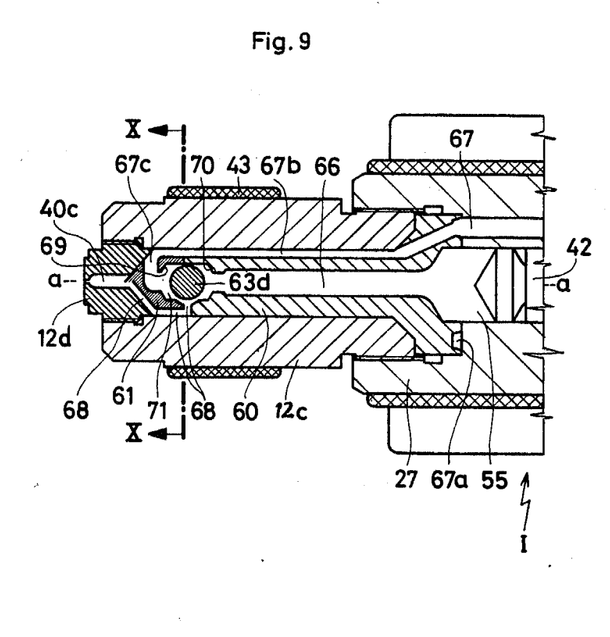
FIG. 9 shows another modification, similar to that of FIG. 7, in a longitudinal cross section taken along line IX—IX of FIG. 10.
Figure 10:
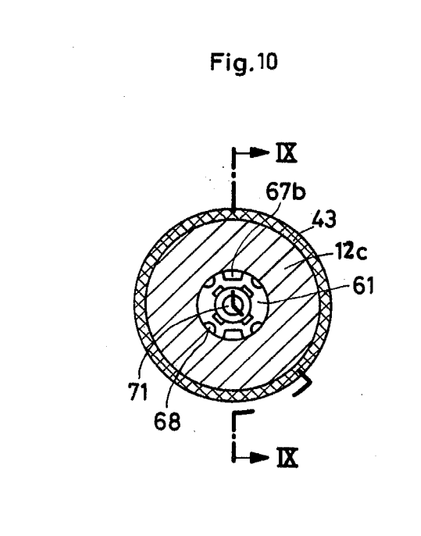
FIG. 10 is a transverse cross section taken along line X—X of FIG. 9.

FIG. 7a shows a modification of the pulsating element. The double-taper-shaped element 63 of FIG. 7 has been replaced with a mushroom-shaped pulsating element 63a, consisting of a tapered head whose shape is similar to the shape of element 63 of FIG. 7, and a fluted shaft 63b with guide ribs 63c engaging the wall of the central pulsation channel 66. The shaft 63b thus provides an axial guidance for the pulsating element 63a, as the latter reciprocates between the tapered shoulders 69 and 70 inside the pulsation chamber 71.

It should be understood that the mushroom-shaped pulsating element 63a of FIG. 7a could also be modified so as to have its fluted shaft 63b extending axially forwardly into the distributor head 61, provided the axial entry channel into the pulsation chamber 71 is of sufficient length to accommodate such a shaft. On the other hand, it may even be advantageous to provide fluted shaft portions on both axial sides of the pulsating element, in order to guide the latter in the distributor head 61 as well as in the nozzle core 60. The axial flutes on the shaft 63b allow for the material flow to reach the pulsation chamber 71. The action of the pulsating element, by alternatingly closing the pulsation channels of the two injection units, produces a positive interruption of the material stream from one injection unit, as the plastification screw of the other injection unit is advanced, thereby producing an exact, reproducible dosage of the incremental charges which are being fed to the common nozzle channel 40c. The axial guidance of the pulsating element 63a further improves the accuracy and consistancy with which the incremental charges are determined.

Instead of using a double-taper-shaped pulsating element, with or without a fluted shaft, as shown in FIGS. 7 and 7a, respectively, it is also possible to use a spherical pulsating element in the form of a simple pulsating ball, as is shown in the embodiments of FIGS. 9–12. This shape may be advantageous in connection with distributor heads of comparatively small dimensions, especially where more than one distributor head is called for, as in the embodiment of FIG. 12.

In order to be able to reliably adjust and reproduce the settings the apparatus of the invention for the creation of a variety of marbling patterns, it is of major importance that the pulsation channels 31a and 32a, or 66 and 67, respectively, be joined at a point which is located as closely as possible to the mold cavities 33 and 34 of the injection molding die. This means that the combined length of the nozzle channel 40 or 40c and of the sprue channel 44 or 44a should be as short as possible. The most favorable embodiment from this point of view is that of FIGS. 3 and 4. However, this embodiment lacks the precise pulsating action which is obtained with the help of the pulsating elements of FIGS. 7–12.

The several embodiments of FIGS. 7 through 12, apart from the fact that they all feature a pulsation chamber with a reciprocating pulsation element, also have in common that the vertical injection unit II is mounted on top of the horizontal injection unit I, rather than on top of an injector head 11 which then forms a mechanical connection between the plastification cylinders of the two injection units. With the converging pulsation channels arranged inside the discharge nozzle of the horizontal injection unit I, it becomes possible to completely do away with the injector head, so that the horizontal injection unit I, with its modified discharge nozzle 12c can be mounted in the same way as it would be mounted, when used as the sole injection unit, to injecting directly into the stationary die half in the axial direction, by reaching through the stationary die carrier member 30.

Figure 11:
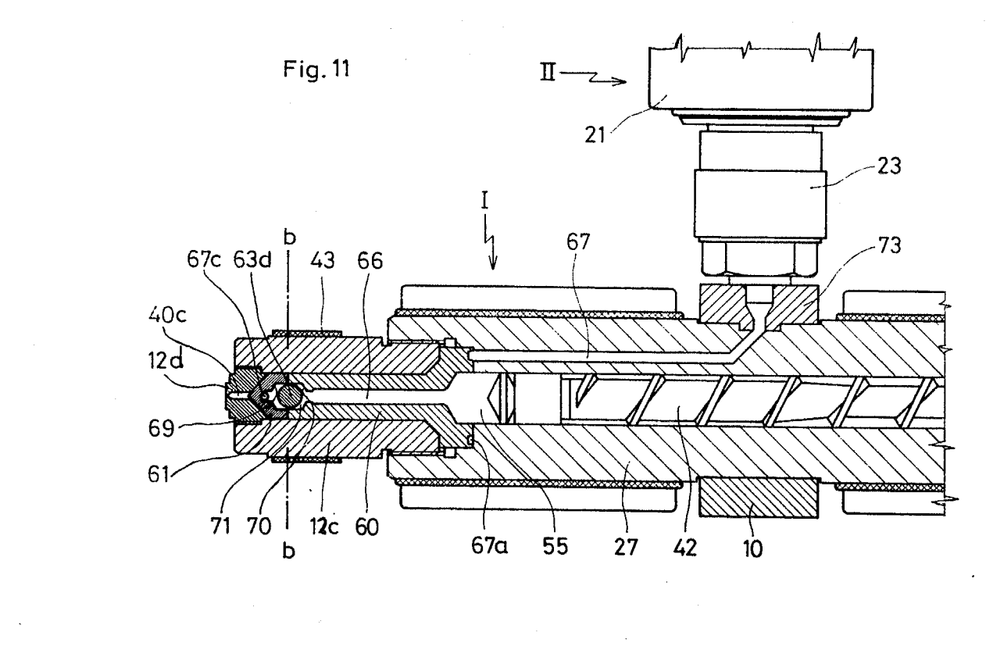
FIG. 11 shows the forward end portions of the two injection units in another embodiment of the invention.
Figure 12:
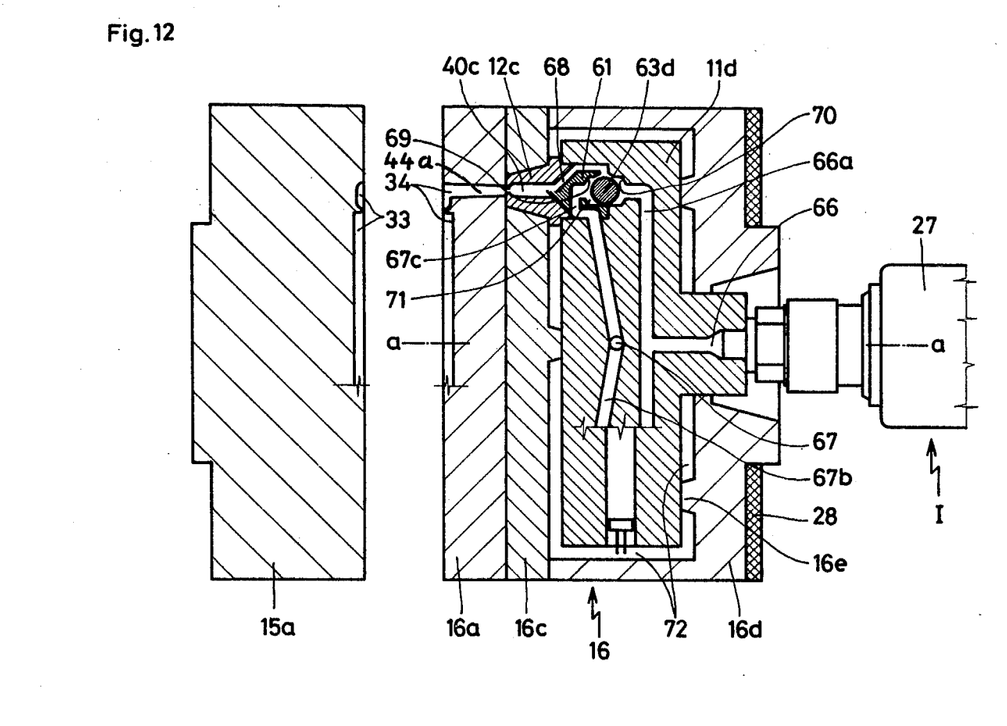
FIG. 12 shows still another embodiment of the invention.

The mounting of the vertical injection unit II on top of the horizontal injection unit I is shown in FIG. 11. It is assumed to be understood that the horizontal injection unit I is supported and guided for axial displacement on the parallel supporting rods 26 which are shown in FIGS. 2, 4, and 6. A transverse mounting yoke 10, which is supported on the rods 26, also supports the forward portion of the horizontal plastification cylinder 27, while having attached thereto two vertical supporting rods like the ones which are shown in FIGS. 2 and 4. A mounting bracket 73, which clamps the horizontal plastification cylinder 27 to the mounting yoke 10, has a connecting face for the discharge nozzle 23 of the vertical plastification cylinder 21. Angled channel portions lead from the mounting bracket 73 to the horizontal pulsation channel 76 which runs parallel to the bore 55 of the horizontal plastification cylinder 27.

The combined injection units are thus displaceable horizontally in the same way as would be a single horizontal injection unit. It follows that a regular injection molded machine, designed for axial injection, can be readily converted to operate in accordance with the method of the present invention, by removing the regular injection unit and replacing it with a two-color dual injection unit of the kind which is shown in FIG. 11, for example. As is the case with a single injection unit with a non-closing injector nozzle, the modified injector nozzle 12c of the two-color device remains in contact with the sprue channel of the stationary die half during the plastification and injection of the plastic raw materials. Just prior to retraction of the device from the sprue channel, the residual pressure inside the cavities of the injector nozzle is relieved, through a short rearward relief stroke of the plastification screw 42. This relief stroke assures that there will be no plastic raw material discharged from the injection channel 40c, while the nozzle is withdrawn from the sprue channel.

The embodiment of FIG. 12 is one which is designed for simultaneous injection through multiple sprue channels 44a, as would be necessary for the injection molding of spectacle frames, for example. In general, the arrangement of the stationary die half 16 is similar to the embodiment of FIG. 3, inasmuch as the die half 16 is modified to enclose in it a special injector head 11d with appropriate pulsation channels 66 and 67 for the two injection units. Immediately behind the two sprue channels 44a (only one channel being shown in FIG. 12) are arranged two injector nozzles 12c with distributor heads 61 and pulsation chambers 71 of the type which have been described further above in connection with FIGS. 7–11. The injector nozzles 12c are axially clamped between a spacer plate 16c and the injector head 11d, the latter being accommodated inside the cavity of a hollow die base 16d, spacer ribs 16e positioning the injector head 11d, while the major portion of the latter is surrounded by a heat insulating gap 72. The hollow die base 16d and the spacer plate 16c thus completely enclose the injector head 11d between them, the mold plate 16a with its mold cavities 33 and 34 being bolted to the spacer plate 16c. The pulsation channels 66 and 67, coming from the horizontal and vertical injection units I and II, respectively, have transverse branch channels 66a and 67b leading to the two pulsation chambers 71, on opposite axial ends thereof.

It should be understood, of course, that the foregoing disclosure describes only preferred embodiments of the invention and that it is intended to cover all changes and modifications of these examples of the invention which fall within the scope of the appended claims.

I claim the following:

1. An apparatus for injecting confluent streams of plastic material from separate sources into the molding die of an injection molding machine, the apparatus comprising in combination:

first and second injection units, structurally connected to each other, each unit having a plastification cylinder, a plastification screw inside said cylinder, and hydraulic drive means operative to rotate and axially advance the plastification screw inside the plastification cylinder, thereby plastifying and injecting raw material from the forward end of the respective injection unit;

pulsation generating means operative to control the hydraulic drive means of at least one of the two injection units, for the execution of partial injection strokes, at regular intervals and of consistent displacement, and also operative to control the hydraulic drive means of both injection units, for the execution of alternating partial injection strokes, at regular intervals and of consistent displacement;

an injector nozzle connected to both injection units, said nozzle having a nozzle discharge channel on its forward extremity adapted for engagement against the opening of a sprue channel of the injection molding die, the injection nozzle further enclosing a pulsation chamber upstream of its discharge channel, and separate pulsation channels leading from the plastification cylinders of the two injection units to the pulsation chamber, so that the raw materials which are injected by the two plastification screws enter the pulsation chamber through entry ports of their separate pulsation channels and, after confluence inside the latter, exit therefrom via the nozzle discharge channel; and a pulsating element floatingly arranged inside the pulsation chamber of the injector nozzle in such a relationship to the entry ports of the two pulsation channels that an inflow of raw material from one entry port will move the pulsating element into a port-closing position on the other entry port, and vice versa, thereby opening and closing the pulsation channels in unison with the injection pulsations which are being generated by the pulsation generating means.

2. A plastic materials injecting apparatus as defined in claim 1, wherein the entry ports by which the two pulsation channels open into the pulsation chamber are arranged in alignment with each other, on opposite sides of the pulsation chamber; and the nozzle discharge channel has an exit port from the pulsation chamber which is arranged midway between said two entry ports.

3. A plastic materials injecting apparatus as defined in claim 2, wherein said oppositely arranged entry ports of the pulsation channels are edges of bores; and the pulsating element is spherical in shape, cooperating with the edges of said bores to open and close the pulsation channel entry ports.

4. A plastic materials injecting apparatus as defined in claim 2, wherein said oppositely arranged entry ports of the pulsation channels have tapered valve seats which are formed by inclined shoulder portions surrounding the extremities of the pulsation channels; and the pulsating element is a pellet-shaped body, having oppositely oriented tapered surfaces which match the tapered valve seats of the pulsation channel entry ports.

5. A plastic materials injecting apparatus as defined in claim 2, wherein said oppositely arranged entry ports of the pulsation channels have tapered valve seats which are formed by inclined shoulder portions surrounding the extremities of the pulsation channels; and the pulsating element is mushroom-shaped, having a pellet-shaped head portion and a smaller shaft portion, the head portion having oppositely oriented tapered surfaces which match the tapered valve seats of the pulsation channel entry ports, and the shaft portion having longitudinal guide ribs reaching into, and being guided by, a straight bore portion of one of the two pulsation channels.

6. A plastic materials injecting apparatus as defined in claim 1, wherein the injector nozzle is fixedly attached to the forward extremity of the plastification cylinder of the first injection unit, having the associated first pulsation channel arranged in coaxial alignment with the bore of its plastification cylinder;

the second injection unit is mounted radially against the outside of the plastification cylinder of the first injection unit; and the second pulsation channel of the injector nozzle extends inside the latter, in an axial direction, parallel to the first pulsation channel, and continuing axially in the wall of the plastification cylinder of the first injection unit, to a radially oriented inlet port for the second injection unit.

7. A plastic materials injecting apparatus as defined in claim 6, wherein the injector nozzle is an assembly of a nozzle body with a large axial bore, of a nozzle core occupying a major rearward length portion of said bore, and of an injector mouth piece occupying a shorter forward length portion of said bore;

the pulsation channel which leads to the first injection unit is in the form of an axial center bore in the nozzle core;

the major portion of the pulsation channel which leads to the second injection unit is in the form of at least one longitudinal groove extending along the interface between the nozzle body and the nozzle core; and the pulsation chamber is defined by oppositely oriented axial recesses in the nozzle core and in the injector mouth piece.

8. A plastic materials injecting apparatus as defined in claim 7, wherein the injector mouth piece includes, on its rearward extremity, a distributor heads which forms one of said axial recesses defining the pulsation chamber;

the distributor head accomodates a length portion of the second pulsation channel which leads from said longitudinal groove to its associated entry port, located at the forward side of the pulsation chamber; and the distributor head further accomodates a length portion of the nozzle discharge channel which terminates at a radially oriented exit port of the pulsation chamber, located midway between its axial pulsation channel entry ports.

9. A plastic materials injecting apparatus as defined in claim 7, wherein the nozzle core has at its rearward extremity an enlarged flange portion which engages a matching recess of the attached plastification cylinder of the first injection unit;

the length portion of the second pulsation channel which extends in the wall of the plastification cylinder starts in said recess; and a connecting length portion of said second pulsation channel extends from said recess to said longitudinal groove, via a bore in the flange portion of the nozzle core.

10. A plastic materials injecting apparatus as defined in claim 1, wherein the injector nozzle has a plurality of nozzle discharge channels adapted for engagement against matching sprue channels of the injection molding die; and the injector nozzle encloses an equal number of pulsation chambers with pulsating elements which are located upstream of said discharge channels, separate pulsation channels leading from the plastification cylinders of the two injection units to each pulsation chamber.

* * * * *